July 24, 1923.
J. M. KIRBY ET AL
GAS GENERATOR
Filed March 3, 1921
1,462,705
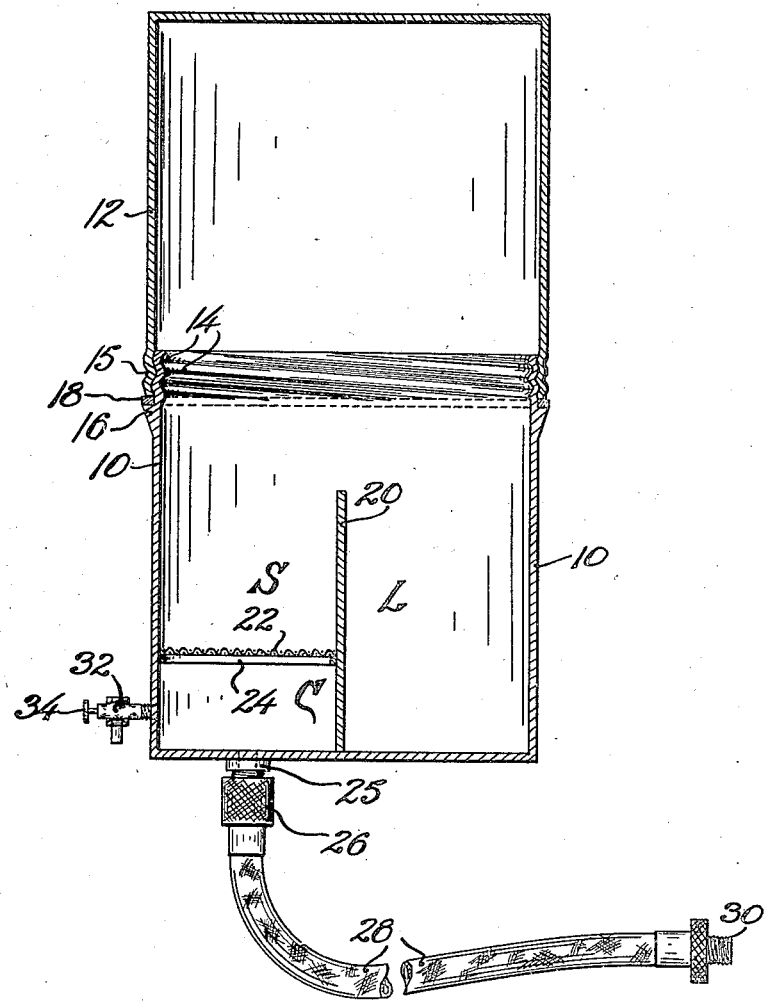
Inventor
J.M.Kirby and B.E.Hartson.
By
Attorney Patented July 24, 1923.

1,462,705

UNITED STATES PATENT OFFICE.

JOSEPH M. KIRBY AND BERT E. HARTSON, OF BOULDER, COLORADO.

GAS GENERATOR.

Application filed March 3, 1921. Serial No. 449,494.

*To all whom it may concern:*

Be it known that we, JOSEPH M. KIRBY and BERT E. HARTSON, citizens of the United States, residing at the city of Boulder, and county of Boulder and State of Colorado, have invented certain new and useful Improvements in Gas Generators; and we do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to facilitate inflation of tires when no source of compressed air is at hand, without resorting to the laborious task of operating a hand pump.

It frequently happens that it is necessary to stop in some remote place to repair a tube which has been punctured. This requires subsequent inflation and ordinarily this must be done by means of a hand pump which is slow and difficult. Even where spare tires or tubes are carried, punctures often occur, especially on long trips, in sufficient number to use up all the spare tires and tubes, so as to require repair of those which have been punctured.

In order to facilitate inflation of tires, this invention presents a method and means for conducting the same whereby the tire may be inflated by means of gas generated chemically.

Briefly, the invention comprises the mingling of two or more substances which chemically generate gas in large quantities and under pressure sufficient to produce inflation. The mechanism used comprises a container having in one end a partition providing two chambers, one of which may receive a solid, and the other a liquid. After the cover member has been sealed in place, the container is adapted to be inverted so as to mingle the materials and cause generation of gas which is led from the container to the tire or other article to be inflated. Preferably the chemicals used are sodium bicarbonate and sulphuric acid, because they yield a larger quantity of gas under pressure high enough for inflation purposes.

The drawings disclose a container equipped to carry on the method of this invention. In these drawings the container is shown as composed of a lower member 10 and a top member 12, the member 10 having threads 14 to receive threads 15 of the member 12. An annular shoulder 16 is provided on the part 10 to receive a sealing ring 18 against which the edge of part 12 is forced to seal the container. The lower member 10 is provided with a diametrically-disposed partition 20 which divides the same into two chambers, one of which as indicated at L is adapted to receive a liquid, and the other indicated at S is adapted to receive a solid. A small chamber C is formed in the lower part of the chamber S by means of a screen 22, which is supported across said chamber S by means of a shoulder 24. Said screen 22 may be forced into position so that friction will retain it when the container is inverted. A nipple 25 is provided on the outside of member 10 for the purpose of conducting gas generated in the container from the chamber C. The nipple 25 is threaded to receive a union 26 on a piece of hose or tubing 28 provided at its opposite end with a connection 30 to be attached to the valve of a tire in well-known fashion. A pop valve 32 is provided leading from the chamber C and adjustable to varying pressures, as by means of a rotatable thumb screw 34.

In use a liquid, preferably sulphuric acid, is placed in the chamber L and a solid, preferably sodium bicarbonate, is placed in the chamber S upon the screen 22. The cover portion 12 is then screwed firmly into place, so as to seal the container; the connection 30 is screwed into position on the valve of the tire to be inflated, and the container is inverted. This allows the sodium bicarbonate and the sulphuric acid to fall into the member 12, whereupon the generation of gas commences. The screen 22 is fine enough to serve as the separating means to prevent the passage of particles of liquid or solid, so that a clean gas is conducted through the hose 28 to the tire. At the same time the small chamber C will serve as a collector and condenser for small quantities of vapor which may pass through the screen 22. The pop valve 32 is adjusted by means of the screw 30 so that when the pressure in the tire reaches a given point, the surplus gas will be blown off through said valve 32.

Preferably, the chemicals will be provided in measured form, that is, the bicarbonate of soda may be prepared in the form of a compressed tablet and the sulphuric acid may be carried in capsules. The quantity of chemical contained in said tablets and capsules will be sufficient to generate approximately the amount of gas required for inflation of the tire, and if desired, the tablets and capsules may be prepared in different sizes to furnish gas approximating the amounts required for different sizes of tires. Obviously, small bottles containing measured quantities of the solid and liquid may be used instead.

From the foregoing it will be seen that we have invented a simple method and apparatus to be used in conjunction therewith for chemically inflating tires or the like, said apparatus being adapted to be carried in a small space in an automobile and itself adapted to carry a fair size stock of materials in small bottles or in the form of tablets and capsules.

Obviously the process may include also the generation of gas within the container by application of heat or by slow combustion.

We claim:

1. A portable inflating device comprising a container adapted to be inverted having at one end a liquid-receiving chamber and a solid-receiving chamber, the other end being adapted to receive liquid and solid as it falls from said chambers when inverted, and a hose leading from the container to conduct gas generated therein.

2. A portable inflating device comprising a container adapted to be inverted having at one end a liquid-receiving chamber and a solid-receiving chamber, the other end being adapted to receive liquid and solid as it falls from said chambers when inverted, a screen in said solid-receiving chamber and spaced from the bottom thereof to receive a solid and to provide a gas-receiving chamber between said bottom and said screen, and a hose leading from said gas-receiving chamber to conduct gas generated in the container and supplied to said gas-receiving chamber through said screen.

3. A portable inflating device comprising a container adapted to be inverted having at one end a liquid-receiving chamber and a solid-receiving chamber, the other end being adapted to receive liquid and solid as it falls from said chambers when inverted, a screen in said solid-receiving chamber and spaced from the bottom thereof to receive a solid and to provide a gas-receiving chamber between said bottom and said screen, a hose leading from said gas-receiving chamber to conduct gas generated in the container and supplied to said gas-receiving chamber through said screen, and a pop-valve also leading from said gas-receiving chamber.

In testimony whereof we affix our signatures.

JOSEPH M. KIRBY.
BERT E. HARTSON.